Aug. 6, 1935.     C. G. MUNTERS     2,010,408
REFRIGERATING SYSTEM
Filed Jan. 12, 1933      4 Sheets-Sheet 2

INVENTOR
Carl Georg Munters
BY
ATTORNEY

Aug. 6, 1935.  C. G. MUNTERS  2,010,408
REFRIGERATING SYSTEM
Filed Jan. 12, 1933  4 Sheets-Sheet 3

Fig. 5

INVENTOR
Carl Georg Munters
BY
ATTORNEY

Aug. 6, 1935.   C. G. MUNTERS   2,010,408
REFRIGERATING SYSTEM
Filed Jan. 12, 1933   4 Sheets-Sheet 4

Fig. 6

INVENTOR.
Carl Georg Munters
BY
ATTORNEY.

Patented Aug. 6, 1935

2,010,408

UNITED STATES PATENT OFFICE 2,010,408

REFRIGERATING SYSTEM

Carl Georg Munters, Stockholm, Sweden, assignor, by mesne assignments, to Electrolux Servel Corporation, New York, N. Y., a corporation of Delaware Application January 12, 1933, Serial No. 651,260
In Germany March 5, 1932

48 Claims. (Cl. 62—119.5)

This invention relates to refrigeration and more particularly to improvements in the method of and apparatus for producing refrigeration with a system of the continuous absorption type.

In accordance with this invention, rectification of vapors produced by heat in the generator is improved and the heat of rectification is utilized to increase the efficiency of operation of the system. This is accomplished by conducting weak absorption liquid, after cooling by heat transfer to the rich absorption liquid from the absorber, in heat exchange relation with vapors from the generator. Also, in accordance with this invention, improved heat transfer is obtained between the weak and strong solutions in the liquid heat exchanger.

Other objects and advantages will be apparent from the following description taken in connection with the accompanying drawings, in which.

This invention relates generally to all absorption refrigerating systems but is herein described in connection with a continuous absorption system in which the pressure is equalized by a circulating inert gas, as shown schematically in Fig. 1 of the drawings. Obviously any suitable combination of fluids may be used in this system, but, for the purposes of description, ammonia may be the cooling fluid, water the absorbent, and hydrogen the inert gas.

Figures 1, 2:
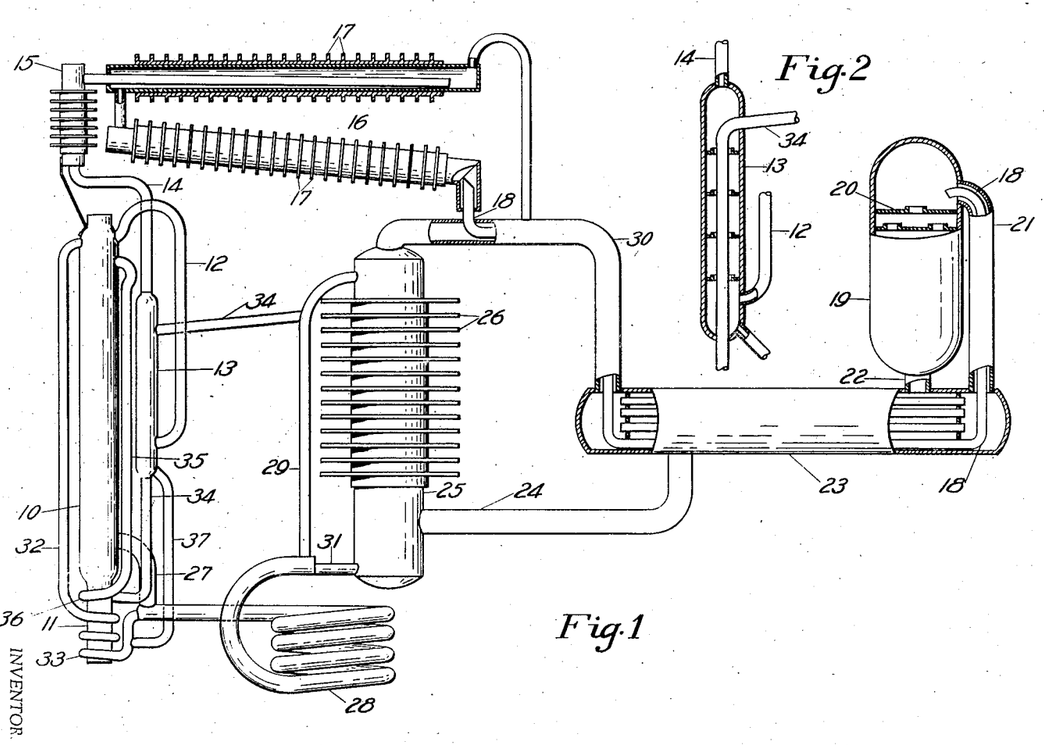
Fig. 1 shows schematically a rectifier in accordance with this invention embodied in a refrigerating system of the continuous absorption type in which pressure is equalized by a circulating inert gas.
Fig. 2 is a detail view showing in vertical section the rectifier in Fig. 1.

Referring to Fig. 1, a generator 10 containing a solution of ammonia in water is heated by any suitable heating means such as a gas burner (not shown) and heating flue 11 which extends upwardly through the generator. Ammonia vapor expelled from solution by heating in the generator flows through conduit 12, and air-cooled rectifier 15 to the condenser 16, which, as well known in the art, may be cooled by circulating water or, as illustrated, by ambient air for which purpose the condenser is provided with heat radiating fins 17. Ammonia, condensed to liquid in the condenser 16, flows through conduit 18 into the upper part of the evaporator 19 and flows downwardly over baffle plates 20, evaporating by diffusion into the hydrogen which enters the evaporator through conduit 21.

The resulting gas mixture, usually referred to as "rich gas", flows from the evaporator 19 through conduit 22, gas heat exchanger 23, and conduit 24 to the absorber 25, which latter, similarly to the condenser, can be cooled by water or, as illustrated, by air, being provided for the latter purpose with heat radiating fins 26. In the absorber, ammonia is absorbed out of the rich gas by weak absorption liquid which flows by gravity from the generator 10 through conduit 27, liquid heat exchanger 28, and conduit 29 into the upper part of the absorber. The hydrogen from which ammonia has been absorbed and commonly referred to as "weak gas" returns through conduit 30, gas heat exchanger 23, and conduit 21 to the evaporator 19. Circulation of the gas between the evaporator and absorber occurs due to the difference in weight between the rich and weak gas.

Enriched absorption liquid accumulates in the lower part of the absorber 25 from where it flows through conduit 31, liquid heat exchanger 28, and thermosyphon conduit 32 back to the generator 10. The lower part 33 of the thermosyphon conduit 32 is arranged to be heated by the generator heating means as by coiling around the lower end of the flue 11. Circulation of the absorption liquid between the generator and absorber is maintained due to difference in liquid levels in the generator and absorber, the enriched absorption liquid being raised from the absorber to the generator level through conduit 32 by thermosyphonic action, as well known in the art. For a more detailed description of this type of system reference may be had to Patent No. 1,609,334 to von Platen et al.

For the best efficiency in operation of this system, only pure ammonia vapor should be delivered from the generator to the condenser. However, the generator vapor is usually a mixture of ammonia and water, wherefore it is desirable to remove the water vapor from the ammonia between the generator and the condenser. Due to the difference in boiling points of the ammonia and water, this may be accomplished by cooling the mixture to condense out the water which is then returned to the generator. This is usually referred to as rectification and it is obvious that greater rectification results in lower condenser losses.

In accordance with this invention, weak absorption liquid from the generator is first cooled by heat transfer to the enriched absorption liquid in the liquid heat exchanger and then conducted in heat exchange relation with the vapor flowing from the generator toward the condenser. It is obvious that the heat of rectification should not be transferred to the absorber. To do so would only increase the losses in the latter wherefore, as illustrated in the drawings and herein described, either a portion of the weak absorption liquid is circulated from the liquid heat exchanger through the weak liquid rectifier back to the generator or all of the weak absorption liquid is conducted through the rectifier and again cooled by heat transfer to the strong absorption liquid before introduction into the absorber, in both cases the heat of rectification being returned to the generator.

Referring to Figs. 1 and 2, vapors from the generator flow through conduit 12, rectifier casing 13, and conduit 14 toward the condenser. A portion of the weak absorption liquid flowing upwardly in conduit 20 after passing through the liquid heat exchanger 28 is conducted through conduit 34 which extends downwardly through the rectifier casing 13 and is returned to the generator 10, in a well known manner, through a thermosyphon conduit 35, the lower end 36 of which is arranged to be heated by the generator heating means as by coiling around the flue 11. Due to the temperature of the rectifier 13 maintained by the by-passed weak absorption liquid, water condenses out of the generator vapors and accumulates in the lower part of the rectifier casing 13 and is returned to the absorption liquid circuit through a drain conduit 37 which is connected to the strong liquid return line from the absorber to the generator.

With this arrangement there is obtained not only rectification of the generator vapors but also a better heat transfer between the weak and enriched absorption liquid in the liquid heat exchanger 28. Assuming that there is required in the absorber $x$ ounces of weak absorption liquid to absorb 1 ounce of ammonia, then $x$ ounces of weak liquid and $x+1$ ounces of strong liquid must flow at the same time through the liquid heat exchanger, thus giving unlike quantities of liquid in heat exchange relation. There is, in addition, heat radiation loss in the liquid heat exchanger and it will be readily apparent that the strong liquid receives less heat from the smaller quantity of weak liquid than is desirable. However, in accordance with this invention a greater quantity of weak liquid is circulated than is necessary for absorption, the extra quantity being by-passed through the rectifier back to the generator, whereby the quantity of weak liquid in the liquid heat exchanger is as great as or greater than the quantity of strong liquid, thereby resulting in greater transfer of heat to the strong liquid and a sufficient excess of weak liquid can be circulated to compensate for the radiation loss.

Figure 3:
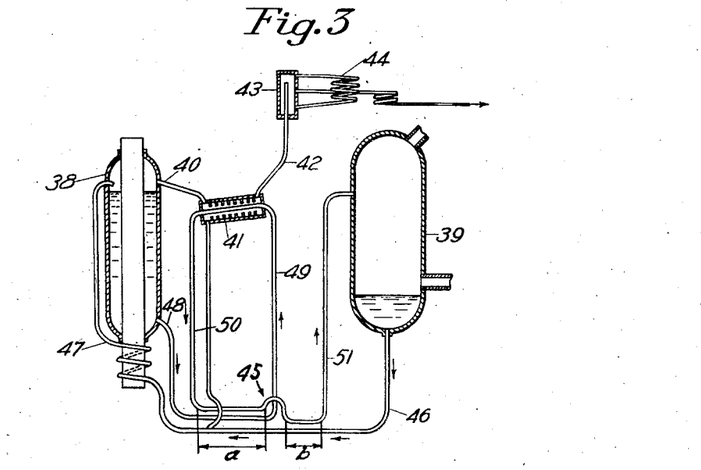
Fig. 3 shows schematically, with parts in vertical section, the generator and absorber of a refrigerating system similar to that in Fig. 1 interconnected by a modified arrangement contemplated by this invention.

In Fig. 3 are shown a generator 38 and absorber 39 which are parts of a refrigerating system similar to that described in connection with Fig. 1. Vapors from the generator flow through conduit 40, weak liquid rectifier 41, and conduit 42 to a separator 43, the latter being different from the rectifier 15 of Fig. 1 in that whereas the rectifier 15 is arranged for air cooling, the vessel 43 is cooled by condensate from the condenser 44.

In this modification, all of the weak absorption liquid is conducted through the rectifier 41 on its way to the absorber, and the liquid heat exchanger 45 is divided into two parts $a$ and $b$. Enriched absorption liquid from the absorber flows through conduit 46, both parts $a$ and $b$ of the liquid heat exchanger 45, and thermosyphon 47 to the generator. Weak absorption liquid from the generator flows through conduit 48, the part $a$ of the liquid heat exchanger 45, and through conduit 49 to the rectifier 41. In part $a$ of the heat exchanger, the weak liquid is cooled by heat transfer to the strong liquid and in rectifier 41 its temperature is increased by the heat of rectification. From the rectifier 41, weak liquid flows through conduit 50, both parts $a$ and $b$ of the liquid heat exchanger 45, and conduit 51 to the absorber. In this embodiment of the invention all of the weak absorption liquid is conducted in heat transfer relation to the generator vapors but the heat of rectification is transferred to the enriched absorption liquid before the weak absorption liquid is conducted to the absorber wherefore, as far as the heat exchange between the weak and strong liquid is concerned, although a quantity of weak liquid smaller than the quantity of strong liquid is flowing through the heat exchanger, the heat transfer occurs in two stages, the second stage involving the heat of rectification which, transferred to the strong liquid, compensates for the radiation loss of the heat exchanger referred to above.

Figure 4:
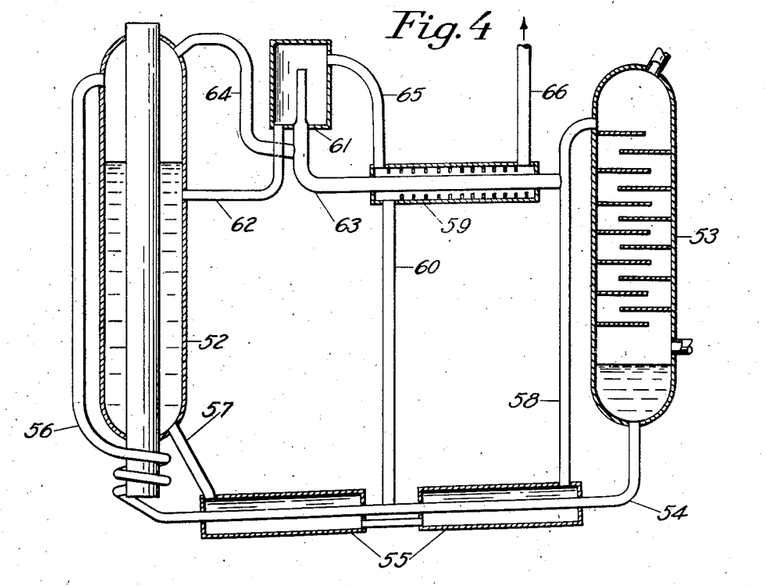
Fig. 4 a view similar to that of Fig. 3 embodying an arrangement contemplated by this invention in which generator vapors are utilized for circulation of the weak absorption liquid.

The rectifying arrangement illustrated in Fig. 4 of the drawings is similar to that described in connection with Fig. 1 except that the generator vapors are utilized for circulating the by-passed weak absorption liquid. A generator 52 and absorber 53 are adapted to be connected in refrigerating systems similar to that described in connection with Fig. 1. Enriched absorption liquid flows from the absorber through conduit 54, liquid heat exchanger 55, and the thermosyphon 56 into the generator. Weak absorption liquid flows from the generator through conduit 57, liquid heat exchanger 55, and conduit 58 into the upper part of the absorber. Similarly to the operation of the system described in connection with Fig. 1, part of the weak absorption liquid from conduit 58 is by-passed through a rectifier 59. A drain conduit 60 from the rectifier 59 provides for return of water to the strong liquid return conduit from the absorber to the generator. In this modification there is provided a vessel 61 above the liquid level in the generator which is connected to the latter by a drain conduit 62 for weak absorption liquid. By-pass conduit 63, which passes through the rectifier 59, extends upwardly into the vessel 61 and a conduit 64 for vapor from the generator 52 is connected to the rising portion of the weak liquid conduit 63. This is a well known vapor liquid lift arrangement by which the by-passed weak absorption liquid in conduit 63 is raised by the generator vapor into the vessel 61 from which it returns to the generator through conduit 62. The generator vapors flow from the upper part of vessel 61 through conduit 65, rectifier 59, and conduit 66 to the condenser, not shown. In addition to the advantages pointed out in connection with the description of the arrangement in Fig. 1, this modification presents the additional advantages of further rectification of the generator vapors passing through the weak liquid in conduit 63 and at the same time eliminating the thermosyphon or other means for returning the by-passed weak liquid to the generator.

Figure 5:
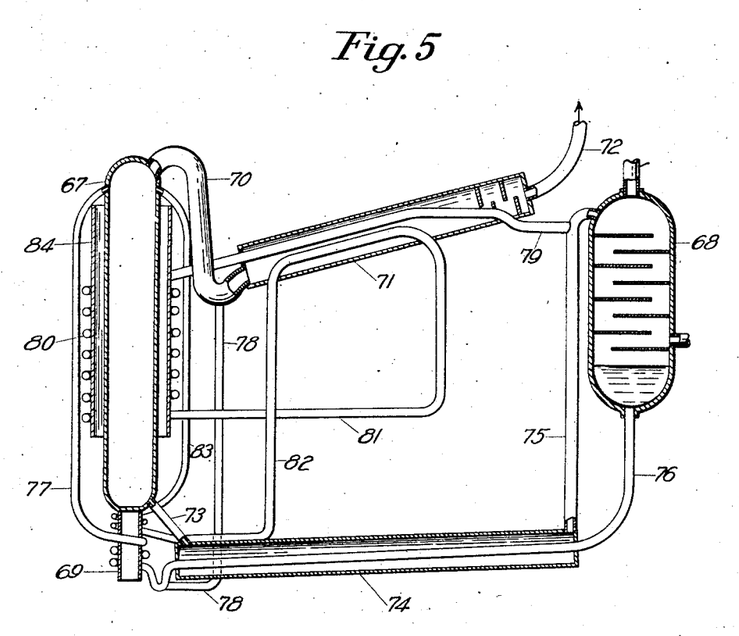
Figs. 5 and 6 show schematically the generator and absorber of a refrigerating system similar to that in Fig. 1 and rectification systems contemplated by this invention in which the heat of rectification is usefully applied to reduce the heat capacity of the generator.

In Fig. 5 are shown a generator 67 and absorber 68 adapted to be connected in a refrigerating system similar to that described in connection with Fig. 1, the generator 66 being heated by an electric heating element, not shown, adapted to be received in a casing 69. Hot vapors from the generator 67 flow through conduit 70, rectifier 71, and conduit 72 toward the condenser, not shown. Weak absorption liquid in the generator flows through conduit 73, liquid heat exchanger 74, and conduit 75 to the absorber 68. Enriched absorption liquid flows from the absorber through conduit 76, liquid heat exchanger 74, and the thermosyphon 77 back to the generator. Condensate from the rectifier 71 drains through conduit 78 to the enriched absorption liquid return conduit. As described in connection with Fig. 1, weak absorption liquid is by-passed after passing through the liquid heat exchanger and flows in conduit 79 through the rectifier 71. After passing through the rectifier, the weak liquid flows through a coil 80 and conduit 81 back through the rectifier, and then through conduit 82 and an auxiliary thermosyphon 83 back to the generator.

In this modification, some of the heat of rectification is utilized for reducing the radiation losses of the generator and some of the heat of rectification is returned to the generator. This is accomplished by arranging the coil 80 in good thermal conductive relation to a casing 84 of heat conducting material which is either embedded in or placed around the generator insulating material, not shown. The heat of rectification imparted to the weak absorption liquid in the rectifier is transferred from coil 80 to the casing 84 whereby the temperature of the latter is raised to maintain a smaller temperature difference between this zone and the generator 67, thus decreasing radiation of heat from the latter. After passing from the coil 80, the weak absorption liquid is again circulated through the rectifier through conduit 81 and further heat of rectification is transferred which is returned directly to the generator by the liquid which flows through conduit 82 and is pumped back into the generator through an auxiliary thermosyphon 83 as described in connection with Fig. 1.

Figure 6:
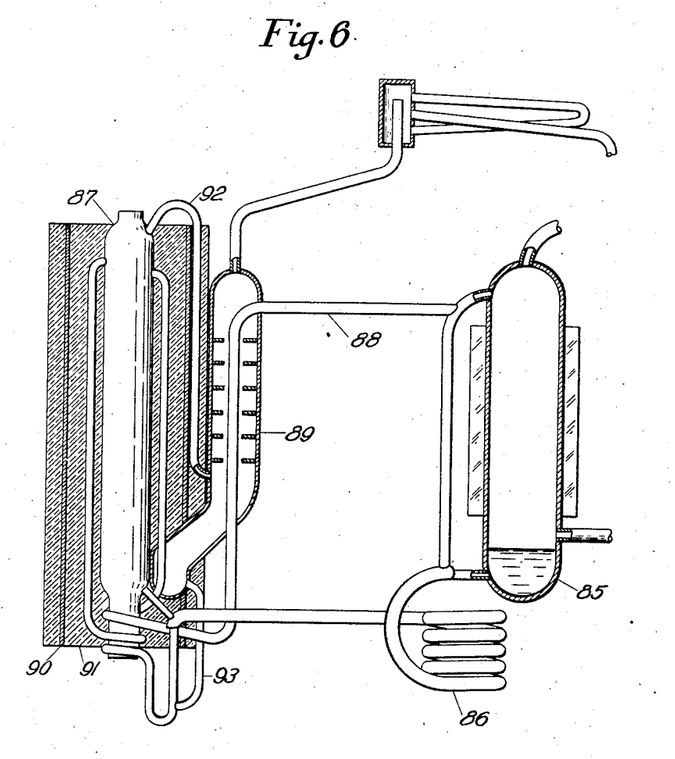

In Fig. 6 of the drawings, is shown an absorber 85, liquid heat exchanger 86, and generator 87 interconnected for the circulation of absorption liquid in the same manner as described in connection with Fig. 1, including the circulation of by-passed weak absorption liquid in conduit 88 through the rectifier 89. In this modification the generator is encompassed by a casing 90 of heat conducting material embedded in the insulation 91 as described in connection with Fig. 5 and the temperature of the casing 90 is raised to decrease radiation losses in the generator by heat transfer from the hot vapors flowing from the generator through conduit 92 which is arranged in good thermal conductive relation with the casing. Also in this modification, the lower end of the rectifier casing 89 is extended into thermal conductive relation with the generator 87 so as to be heated. This is for the purpose of again expelling from solution refrigerant vapor which has been absorbed in the condensate formed in the rectifier before draining through conduit 93 into the enriched absorption liquid return conduit to the generator.

It will be obvious to those skilled in the art that various other changes may be made in the construction and arrangement without departing from the spirit of the invention and therefore the invention is not limited to what is shown in the drawings and described in the specification but only as indicated in the following claims.

I claim:

1. The method of refrigerating with an absorption type system having a generator and absorber which includes, conducting weak absorption liquid from the generator toward the absorber in heat exchange relation with enriched absorption liquid flowing from the absorber to the generator, and conducting a portion of the weak liquid, after said heat exchange, in heat exchange relation with generated vapors back to the generator.

2. The method of refrigerating with an absorption type system having a generator, absorber, and liquid heat exchanger which includes, flowing from said generator through said heat exchanger a greater quantity of weak absorption liquid than necessary for operation of said absorber and conducting the excess liquid in heat exchange relation with generated vapors back to said generator.

3. The method of refrigerating with an absorption system of the pressure equalized type having a generator, liquid heat exchanger, and absorber which includes, flowing enriched absorption liquid from said absorber through said heat exchanger into said generator, conducting from said generator through said heat exchanger a greater quantity of weak absorption liquid than is necessary for operation of said absorber, and flowing the excess liquid in heat exchange relation with generated vapors back into said generator by thermosyphonic action.

4. The method of refrigerating with an absorption type system having a generator, absorber, and liquid heat exchanger which includes, circulating absorption liquid between said generator and absorber through said heat exchanger, and returning a portion of the weak absorption liquid after passage through said heat exchanger back to said generator in heat exchange relation with generated vapors.

5. The method of refrigerating with an absorption type system having a generator, condenser, absorber, and liquid heat exchanger which includes, conducting vapors from said generator toward said condenser, circulating absorption liquid between said generator and absorber through said heat exchanger, and conducting a portion of the weak absorption liquid after passage through said heat exchanger back to said generator in heat exchange relation with vapors flowing from said generator toward said condenser.

6. The method of refrigerating with an absorption type system having a generator, condenser, absorber, and liquid heat exchanger which includes, circulating absorption liquid between said generator and absorber through said heat exchanger, by-passing a portion of the weak absorption liquid after passage through said heat exchanger back to said generator in heat exchange relation with generated vapors flowing toward said condenser, and utilizing vapors from the generator to cause circulation of the by-passed liquid.

7. The method of refrigerating with an absorption type system which includes, conducting weak absorption liquid from the generator in heat transfer relation with enriched absorption liquid from the absorber, and returning a portion of the weak liquid after said heat transfer back to the generator in contact with generated vapors.

8. The method of refrigerating with an absorption type system which includes, conducting weak absorption liquid from the generator in heat transfer relation with enriched absorption liquid from the absorber, conducting a portion of the weak liquid after said heat transfer back toward the generator in heat exchange relation with generated vapors, and introducing generated vapors into said weak liquid in a rising portion of the path thereof to cause circulation.

9. The method of refrigerating with an absorption type system having a generator, absorber, and liquid heat exchanger which includes, flowing enriched absorption liquid from said absorber through said heat exchanger into said generator, conducting from said generator through said heat exchanger a greater quantity of weak absorption liquid than is necessary for operation of said absorber, conducting the excess liquid in heat exchange relation with generated vapors, and introducing generated vapors into said excess liquid to cause flow of the latter back into said generator.

10. The method of refrigerating with an absorption type system having a generator, absorber, and liquid heat exchanger which includes, conducting an excess quantity of weak absorption liquid from said generator through said heat exchanger and conducting the excess quantity of liquid, first in heat exchange relation with vapors from said generator, and then in heat transfer relation with a heat conducting zone surrounding said generator.

11. The method of refrigerating with an absorption type system having a generator, absorber, and liquid heat exchanger which includes, conducting an excess quantity of weak absorption liquid from said generator through said heat exchanger, conducting the excess quantity of liquid in heat transfer relation with hot vapors from said generator to cause rectification thereof, transferring the heat of rectification from the liquid to a zone surrounding said generator, and again conducting the liquid in heat exchange relation with vapors from the generator.

12. The method of refrigerating with an absorption type system having a generator, absorber, and liquid heat exchanger which includes, conducting an excess quantity of weak absorption liquid from said generator to said heat exchanger, conducting the excess quantity of liquid in heat transfer relation with hot vapors from said generator to cause rectification thereof, transferring the heat of rectification from the liquid to a zone surrounding said generator, again conducting the liquid in heat exchange relation with vapors from the generator, and returning the liquid into said generator.

13. The method of refrigerating with an absorption type system having a generator, absorber, and two liquid heat exchangers which includes, conducting enriched absorption liquid in series through said heat exchangers to said generator, and conducting weak absorption liquid from said generator through one of said heat exchangers, then in heat exchange relation with vapors from said generator, and finally through both of said heat exchangers to said absorber.

14. The method of refrigerating with a system of the absorption type having a generator, an absorber, and a liquid heat exchanger which includes, conducting enriched absorption liquid from the absorber through said heat exchanger to said generator, and conducting weak absorption liquid from said generator through a portion of said heat exchanger, then in heat exchange relation with vapors from said generator, and then through said heat exchanger to said absorber.

15. The method of refrigerating with an absorption type system having a generator, an absorber, and a liquid heat exchanger which includes, conducting enriched absorption liquid from said absorber through said heat exchanger to said generator, conducting an excess quantity of weak absorption liquid from said generator through said heat exchanger, conducting the excess quantity of liquid in heat exchange relation with vapors from said generator to condense absorption fluid therefrom, and introducing the condensate into the rich absorption liquid in its path of flow from the absorber to the generator.

16. The method of refrigerating with an absorption type system having a generator, absorber, and liquid heat exchanger which includes, conducting enriched absorption liquid from said absorber through said heat exchanger to said generator, conducting an excess quantity of weak absorption liquid from said generator through said heat exchanger, conducting the excess quantity of liquid in heat exchange relation with vapors from said generator to condense absorption fluid therefrom, heating the condensate to expel refrigerant vapor, and introducing the condensate into the rich liquid in its path of flow toward said generator.

17. The method of refrigerating with an absorption type system having a generator, absorber, and liquid heat exchanger which includes, circulating absorption liquid between said generator and absorber through said heat exchanger, by-passing a portion of the weak liquid after passage through said heat exchanger into heat exchange relation with vapors from said generator to condense absorption fluid therefrom, and conducting the condensate in heat exchange relation with said generator into the rich absorption liquid in its path of flow toward said generator.

18. An absorption type refrigerating system including a generator, an absorber, a liquid heat exchanger, a rectifier, means for circulating absorption liquid between said generator and absorber through said liquid heat exchanger, means for withdrawing a portion of the weak liquid after passage through said heat exchanger and flowing the withdrawn liquid through said rectifier back to said generator, means for conducting vapors from said generator through said rectifier, and means for draining condensate from said rectifier into the rich absorption liquid in its path of flow to said generator.

19. A refrigerating system of the pressure equalized absorption type including, a generator, an absorber, a liquid heat exchanger, a thermosyphon element for circulating absorption liquid between said generator and absorber through said heat exchanger, a conduit for vapors from said generator including a casing extending below the generator liquid level, a by-pass conduit from the weak liquid outlet end of said heat exchanger extending through said casing back to said generator, a thermosyphon element for flowing liquid through last said conduit, and a drain connection from said casing to the strong absorption liquid outlet end of said heat exchanger.

20. A refrigerating system of the pressure equalized absorption type including a generator, a condenser, an absorber, a liquid heat exchanger, means for circulating absorption liquid between said generator and absorber through said heat exchanger, a conduit for vapors from said generator to said condenser extending below the generator liquid level, a by-pass conduit from the weak absorption liquid outlet end of said heat exchanger extending in heat exchange relation with a portion of said vapor conduit back to said generator, and a thermosyphon element for circulating liquid through said by-pass conduit.

21. A refrigerating system of the pressure equalized absorption type including a generator, a condenser, an absorber, a liquid heat exchanger, means for circulating absorption liquid between said generator and absorber through said heat exchanger, a conduit for vapors from said generator to said condenser, a by-pass conduit from the weak absorption liquid outlet end of said heat exchanger extending in heat exchange relation with a portion of said vapor conduit back to said generator, and a vapor liquid lift supplied with vapor from said generator for causing flow of liquid through said by-pass conduit.

22. Refrigerating apparatus of the absorption type including a generator, an absorber, a liquid heat exchanger, means for circulating absorption liquid between said generator and absorber through said heat exchanger, a condenser, a rectifier comprising a casing forming a portion of a conduit for vapors from the generator to the condenser, a shield of heat conducting material extending around said generator in spaced relation thereto, and means for conducting a portion of the weak absorption liquid after passage through said heat exchanger in heat exchange relation respectively with said rectifier and said shield.

23. Refrigerating apparatus of the absorption type including a generator, an absorber, a liquid heat exchanger, means for circulating absorption liquid between said generator and absorber through said heat exchanger, a condenser, a rectifier comprising a casing forming a portion of a conduit for vapors from the generator to the condenser, a shield of heat conducting material extending around said generator in spaced relation thereto, and a conduit for weak absorption liquid from the outlet end of said heat exchanger extending in heat exchange relation first with said rectifier, then with said shield, again with said rectifier, and then into said generator.

24. Refrigerating apparatus of the absorption type including a generator, an absorber, a liquid heat exchanger, means for circulating absorption liquid between said generator and absorber through said heat exchanger, a condenser, an analyzer comprising a casing forming a portion of a conduit for vapors from the generator to the condenser, a shield of heat conducting material extending around said generator in spaced relation thereto, a conduit for weak absorption liquid from the outlet end of said heat exchanger extending in heat exchange relation first with said rectifier, then with said shield, again with said rectifier, and then into said generator, and a thermosyphon element for flowing liquid through last said conduit.

25. In an absorption refrigerating system, a generator, an absorber, means for flowing weak absorption liquid from said generator toward said absorber in heat exchange relation with enriched absorption liquid flowing from said absorber to said generator, and means for flowing weak absorption liquid, after said passage in heat exchange relation with rich liquid, in heat exchange relation with vapors from said generator.

26. In an absorption refrigerating system, a generator, an absorber, means for flowing weak absorption liquid from said generator toward said absorber in heat exchange relation with enriched absorption liquid flowing from said absorber to said generator, and means for by-passing a portion of the weak absorption liquid, after said passage in heat exchange relation with rich liquid, back to said generator in a path extending in heat exchange relation with vapors from said generator.

27. In an absorption refrigerating system having a generator, an absorber, and a liquid heat exchanger, a first circuit for absorption liquid including said elements, and a second circuit having a portion in common with said first circuit through said generator and weak liquid section of said heat exchanger and a further portion extending in heat exchange relation with vapors from said generator.

28. In an absorption refrigerating system having a generator, an absorber, and a liquid heat exchanger, a first circuit for absorption liquid including said elements, a second circuit having a portion in common with said first circuit through said generator and weak liquid section of said heat exchanger, and thermosyphon elements for causing circulation of liquid in said circuits.

29. In an absorption refrigerating system having a generator, an absorber, and a liquid heat exchanger, a first circuit for absorption liquid including said elements, a second circuit having a portion in common with said first circuit through said generator and weak liquid section of said heat exchanger, and a vapor liquid lift for causing circulation of liquid in said second circuit.

30. In an absorption refrigerating system having a generator, an absorber, and a liquid heat exchanger, a first circuit for absorption liquid including said elements, a second circuit having a portion in common with said first circuit through said generator and weak liquid section of said heat exchanger, and a vapor liquid lift supplied with vapors from said generator for causing circulation of liquid in said second circuit.

31. In an absorption refrigerating system having a generator, an absorber, and a liquid heat exchanger, a first circuit for absorption liquid including said elements, a shield of heat conducting material around said generator in spaced relation thereto, a second circuit having a portion in common with said first circuit through said generator and weak liquid section of said heat exchanger, and a further portion extending in heat exchange relation first with vapors from said generator and then with said shield.

32. In an absorption refrigerating system having a generator, a condenser, and an absorber, a conduit for vapors from said generator to said condenser, means for flowing weak absorption liquid from said generator in heat exchange relation with enriched absorption liquid flowing from said absorber to said generator, and means for flowing weak liquid, after said passage in heat exchange relation with rich liquid, in a path extending in heat exchange relation with said vapor conduit.

33. In an absorption refrigerating system having a generator and an absorber, means for flowing weak absorption liquid from said generator in heat exchange relation with enriched absorption liquid flowing from said absorber to said generator, and means for flowing weak liquid, after said passage in heat exchange relation with rich liquid, to said absorber in a path extending first in heat exchange relation with vapors from said generator and again in heat exchange relation with rich liquid from said absorber.

34. In the art of refrigeration with a system in which refrigerant fluid is separated from liquid solution in a generator by distillation, evaporated, and again absorbed in weakened solution which is circulated from the generator through an absorber, that improvement which comprises conducting solution from the generator first in thermal transfer relation with solution returning to the generator from the absorber and then in thermal transfer relation with distillation vapor for rectification of the latter.

35. In the art of refrigeration with a system in which refrigerant fluid is separated from liquid solution in a generator by distillation, evaporated, and again absorbed in weak solution, that improvement which comprises conducting weak solution from the generator in thermal exchange relation with distillation vapor, cooling said weak solution prior to said thermal exchange for rectification of the vapor, and transferring the heat of rectification to said generator.

36. In the art of refrigeration with a system in which refrigerant fluid is separated from liquid solution by distillation, evaporated, and again absorbed in weak solution, that improvement which comprises cooling weak solution and conducting the cooled solution in thermal exchange relation with distillation vapor for rectification of the latter.

37. In the art of refrigeration with a system in which refrigerant fluid is separated from liquid solution in a heated zone by distillation, evaporated, and again absorbed in weak solution, that improvement which comprises conducting weak solution from the heated zone in thermal exchange relation with distillation vapor, cooling said weak solution prior to said thermal exchange for rectification of the vapor, and transferring the heat of rectification to said heated zone.

38. In the art of refrigeration with a system in which refrigerant fluid is separated from liquid solution in a generator by distillation, evaporated, and again absorbed in weakened solution which is circulated from the generator through an absorber, that improvement which comprises conducting solution from the generator first in thermal transfer relation with solution returning to the generator from the absorber and then in thermal transfer relation with distillation vapor for rectification of the latter and transferring heat of rectification to solution flowing toward the generator.

39. In the art of refrigeration with a system in which refrigerant fluid is separated from liquid solution in a generator by distillation, evaporated, and again absorbed in weakened solution which is circulated from the generator through an absorber, that improvement which comprises conducting solution from the generator first in thermal transfer relation with solution returning to the generator from the absorber and then in thermal transfer relation with distillation vapor and again with solution flowing toward the generator to effect rectification of the vapor and return of heat of rectification to the generator.

40. In the art of refrigeration with a system in which refrigerant fluid is separated from liquid solution in a generator by distillation, evaporated, and again absorbed in weakened solution which is circulated from the generator through an absorber, that improvement which comprises cooling residue weak solution, conducting the cooled solution in thermal exchange relation with distillation vapor to condense absorption fluid therefrom, returning the condensate to the generator, and heating the condensate to expel refrigerant vapor therefrom prior to said return to the generator.

41. In the art of refrigeration with a system in which refrigerant fluid is separated from liquid solution in a heated zone by distillation, evaporated, and again absorbed in weak solution, that improvement which comprises cooling weak solution, conducting the cooled solution in thermal exchange relation with distillation vapor to condense solvent fluid therefrom, heating the condensate to expel refrigerant vapor therefrom, and then returning the condensate to said heated zone.

42. In a refrigeration system of the absorption type in which refrigerant fluid is distilled from solution in a liquid solvent, means for conducting weak solution in thermal exchange relation with distillation vapor, and means for cooling the weak solution prior to said thermal exchange sufficiently for rectification of the vapor.

43. In an absorption refrigeration process, flowing a solution of refrigerant in an absorption liquid to a heated zone and expelling refrigerant vapor from the solution, conducting the vapor and the weakened solution from said zone, cooling the weakened solution, and conducting the cooled solution into heat transfer relation with the refrigerant vapor.

44. In an absorption refrigeration process, flowing a solution of refrigerant in an absorption liquid to a heated zone and expelling refrigerant vapor from the solution, conducting the vapor and the weakened solution from said zone, cooling the weakened solution by heat transfer to the solution flowing toward the heated zone, and conducting the cooled solution into heat transfer relation with the refrigerant vapor.

45. In an absorption refrigeration process, flowing a solution of refrigerant in an absorption liquid to a heated zone and expelling refrigerant vapor from the solution, conducting the vapor and the weakened solution from said zone, cooling the weakened solution by heat transfer to the solution flowing toward the heated zone, and conducting the cooled solution into heat transfer relation with the refrigerant vapor for rectification of the latter and again in heat transfer relation with the solution flowing toward the heated zone for transfer thereto of heat of rectification.

46. In the art of refrigeration with a system in which refrigerant fluid is separated from circulating liquid solution by distillation in a generator, evaporated, and again absorbed in weakened solution in an absorber, that improvement which consists in causing flow of enriched solution by thermosyphonic action and causing flow of weakened solution by further separate thermosyphonic action.

47. In a refrigeration system in which refrigerant fluid is separated from circulating liquid solution by distillation in a generator, evaporated, and again absorbed in weakened solution in an absorber, a thermosyphon for causing flow of weak solution and a second thermosyphon for causing flow of enriched solution.

48. In a refrigeration system including a generator and in which refrigerant fluid is separated from circulating liquid solution by distillation in said generator, evaporated, and again absorbed in weakened solution in an absorber, means forming a shield about said generator and arranged to be maintained at an elevated temperature by fluid in the system external to the generator for reducing loss of heat by radiation from the latter.

CARL GEORG MUNTERS.